United States Patent
Franz et al.

(10) Patent No.: US 11,111,833 B2
(45) Date of Patent: Sep. 7, 2021

(54) METHOD FOR HEATING AN EXHAUST SYSTEM OF A COMBUSTION ENGINE OF A MOTOR VEHICLE

(71) Applicant: Robert Bosch GmbH, Stuttgart (DE)

(72) Inventors: Alexander Franz, Gaertringen (DE); Arthur Bastoreala, Remseck am Neckar (DE); Cornelia Nagel, Stuttgart (DE); Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/708,642

(22) Filed: Dec. 10, 2019

(65) Prior Publication Data

US 2020/0191031 A1 Jun. 18, 2020

(30) Foreign Application Priority Data

Dec. 13, 2018 (DE) ...................... 10 2018 221 643.6

(51) Int. Cl.
*F01N 9/00* (2006.01)
*F01N 3/20* (2006.01)

(52) U.S. Cl.
CPC .......... *F01N 3/2006* (2013.01); *F01N 9/007* (2013.01); *F01N 3/2066* (2013.01); *F01N 2900/0601* (2013.01); *F01N 2900/1602* (2013.01)

(58) Field of Classification Search
CPC ...... F01N 3/2006; F01N 9/007; F01N 3/2066; F01N 2900/1602; F01N 2900/0601
See application file for complete search history.

(56) References Cited

U.S. PATENT DOCUMENTS

| | | | | |
|---|---|---|---|---|
| 2005/0229590 A1* | 10/2005 | Bruck | ................. | F01N 13/0093 60/286 |
| 2010/0098612 A1* | 4/2010 | Lee | ..................... | B01D 53/9477 423/239.1 |
| 2010/0146946 A1* | 6/2010 | Andersson | .............. | F01N 9/002 60/287 |
| 2011/0000193 A1* | 1/2011 | Paterson | ............... | F01N 11/002 60/277 |
| 2012/0004825 A1* | 1/2012 | Koch | .................... | F02D 41/024 701/103 |
| 2012/0137660 A1* | 6/2012 | Yan | ......................... | F01N 3/206 60/276 |
| 2014/0343747 A1* | 11/2014 | Culbertson | ........... | F01N 3/2013 700/300 |

FOREIGN PATENT DOCUMENTS

| | | |
|---|---|---|
| DE | 69219111 T2 | 10/1997 |
| DE | 102004046917 A1 | 3/2006 |
| DE | 102012219244 A1 | 4/2014 |

* cited by examiner

*Primary Examiner* — Matthew T Largi
(74) *Attorney, Agent, or Firm* — Michael Best & Friedrich LLP

(57) ABSTRACT

In a method for heating an exhaust system of a combustion engine of a motor vehicle, the exhaust system comprises at least two components for exhaust gas cleaning. For at least one component, a temperature regulation is provided for heating the component while using a heating operation mode. For the heating of the exhaust system, a heating operation is used via a pulse control with heating pulses (101) and heating pauses (102), which switches between a heating operation mode and a normal operation without heating measures.

14 Claims, 3 Drawing Sheets

METHOD FOR HEATING AN EXHAUST SYSTEM OF A COMBUSTION ENGINE OF A MOTOR VEHICLE

BACKGROUND OF THE INVENTION

The present invention relates to a method for heating an exhaust system of a combustion engine of a motor vehicle, wherein the exhaust system comprises at least two components for exhaust gas cleaning. Furthermore, the invention relates to a computer program for carrying out the method, a machine-readable storage medium on which such a computer program is stored, and an electronic controller which is designed to carry out the method.

For the reduction of nitrogen oxides in the exhaust gas of a combustion engine it is known to use an SCR catalyst (Selective Catalytic Reduction) in the exhaust system (exhaust gas line) of a combustion engine. The SCR catalyst works on the basis of a dispensed reducing agent, especially an aqueous urea solution (AdBlue®), wherein the aqueous urea solution in combination with the catalyst surface reduces the nitrogen oxide molecules to elemental nitrogen. In diesel vehicles, such an SCR catalyst is generally combined with a diesel particle filter (DPF). Other multistaged exhaust systems employ a combination of a NOx storage catalyst (NSC) upstream from the diesel particle filter, possibly also in combination with an SCR catalyst, in order to reduce the nitrogen oxide emissions. Particle filters with an SCR coating (SCRF) are also known, which may be combined with an SCR catalyst downstream from the SCRF. Thus, for example, a multistaged exhaust system with NSC-SCRF-SCR or NSC-DPF-SCR can be used.

The SCR catalyst requires a certain temperature level for its full functional capability, which might not be achieved under certain unfavorable driving conditions. This issue occurs in particular in cases where the SCR catalyst is installed at a distance from the engine. In these cases, exhaust gas heating measures may make sense for the heating of the SCR catalyst until reaching its optimal operating temperature. On the other hand, if an NSC is provided in the exhaust system, the NSC with its storage capacity for NOx at low temperatures and/or an optionally provided SCRF installed close to the engine may initially take up the emission burden, for example after a cold start and/or unfavorable driving conditions with a relatively low temperature level in the exhaust system, for example during city driving. At higher engine loads or higher speeds, resulting in correspondingly higher exhaust gas temperatures, the SCR catalyst can then take up the main load downstream from the DPF or the SCRF. In such a situation, with a suitable design of the overall system, a regular exhaust gas heating operation is unnecessary for the heating or maintaining of the temperature of the exhaust gas component, so that an exhaust gas heating would only be done for a DPF regeneration, and thus usually at intervals of several hundred kilometers.

Exhaust gas components need to be checked for proper function during driving operation, and the component monitoring should take place in every driving cycle. A polling of the diagnostic frequency is generally done by a standardized computation (In Use Monitoring Performance Ratio—IUMPR) in the electronic control unit of the motor vehicle, minimum values being demanded for the IUMPR by legislation, requiring for example a successful monitoring at least in every third driving cycle. Furthermore, the OBD legislation requires a single component monitoring, wherein each component in a multistaged exhaust system with different exhaust gas cleaning components must be monitored individually for its compliance with limit values. Since definite exhaust gas temperatures must be reached for the function of individual components, such as the SCR catalyst, and these might not necessarily be achievable in each driving cycle, it may be necessary to activate exhaust gas heating measures for diagnostic purposes, especially for the heating of the SCR catalyst.

SUMMARY OF THE INVENTION

The invention provides a method for heating a multistaged exhaust system of a combustion engine of a motor vehicle, i.e., an exhaust system comprising at least two components for exhaust gas cleaning. It is assumed for the method that at least one component of the exhaust system is provided with a temperature regulation for the heating of the component while using a heating operation mode. The crux of the invention is a pulse control, which is used for the heating, wherein the pulse control alternately switches between a heating operation mode and the normal operation, i.e., without exhaust gas heating measures. The pulse control works with heating pulses and heating pauses. Heating pulses are intervals in which the heating operation is demanded. Heating pauses are intervals in which a normal operation without heating measures is carried out or demanded.

Thanks to the heating, a desired temperature can be achieved in a component of the exhaust system for which no temperature regulation in the proper sense is provided. Thus, for example, a provided temperature regulation may be used for a heating of a diesel particle filter which requires a particular high temperature for its regeneration, in order to reach a desired temperature for example in an SCR catalyst which is required for example for its optimal function and/or for diagnostic purposes. Thus, according to the proposed method, an existing temperature regulation in the motor vehicle may also be used for the heating of other components in the exhaust system, for example for the heating of the SCR catalyst, without having to modify the available operating mode applications and without having to apply and/or install an additional temperature regulator. Thus, one special benefit of the described method is that available operating modes can be used, so that a further heating operation is possible in addition to heating measures which are already standard, such as those for the particle filter regeneration, with relatively little software and application expense. The desired target temperature for the described method in a component in the exhaust system for which no temperature regulation or no temperature regulator is provided, and the conditions for the switchover times can be set as needed without any dependency on the originally provided determination of the heating operation mode used, i.e., for example, the heating operation for the particle filter regeneration, and be stored together with the pulse control used according to the described method in a special computer program.

Thus, in the proposed method, a temperature regulation for the heating of a component in the exhaust system is used in order to heat another component in the exhaust system. This method is not tied to particular heating operation modes, but rather can make use of the respective heating operation modes provided in the motor vehicle. In general, by heating operation modes is meant those kinds of engine operation which are suitable for the heating of the exhaust system. By suitable measures it is possible to shift the center of combustion such that the exhaust gas temperature rises, although the thermal efficiency of the engine is necessarily worse. Furthermore, the exhaust gas temperature can be increased for example by a post-injection, which does not take part in the combustion in the engine and which is burned in an oxidation catalyst. A heating operation mode may bring together several procedures, e.g., an early post-injection, a late post-injection, a displacement of the injection time of the main injection process, different air mass demand, and others. The temperature regulation already present for the heating of a particular component in the exhaust system can make use of a single heating operation mode or various different heating operation modes (operating submodes) depending on the specific circumstances. The proposed method is especially suited as a simple expansion solution for existing controller functions, for example, as an optional expansion of the known diagnostic functions for the SCR catalyst. Furthermore, the method may be used as an alternative to already known temperature regulators, such as for the SCR catalyst, possibly with somewhat lower regulating accuracy.

In other words, the proposed method uses the temperature regulation of one component in the exhaust system for the heating of another component in the exhaust system. For example, the heating mode for a diesel particle filter may be used as a kind of auxiliary mode, since this heating mode is already present from the outset and thus no further operating mode needs to be introduced on a controller with corresponding setup, parametrization, and testing. This has the particular advantage that development expense can be saved by this measure. The proposed pulse control can avoid problems which may arise by a simple heating of the component via its temperature regulation to a particular target temperature, especially also for other components of the exhaust system. Therefore, if only the available heating operation mode via the temperature regulation is demanded until such time as the desired temperature of the component associated with the temperature regulation is reached, and then the heating operation mode is switched off once more, the problem may arise that the component being heated only reaches the desired temperature for a short time and then the temperature quickly declines once more. Alternatively, it might happen that the component being heated reaches the temperature, but then the temperature at first continues to rise in uncontrolled manner and reaches unwanted high values. Finally, due to the heating of the component associated with the temperature regulation, especially in an upstream component, so high a temperature value may be reached during the heating process that damage or destruction results in the upstream component, or in the case of components with storage properties an unwanted ejecting of the stored medium results, such as NOx in the NSC or NH3 in the SCR/SCRF. This involves an undesirable and detrimental emission influence. In order to avoid these problems, the described method works with a pulse control, by which the temperature variation in the exhaust system can be managed much better.

When in the following mention is made of a component to be heated, this involves the component for which a temperature regulation is provided in the traditional sense, for example a diesel particle filter, for which a temperature regulator is provided for the particle filter regeneration. The terms target temperature and target component pertain to the temperature and the component, respectively, for which the herein proposed pulse control is provided for the heating, e.g., the SCR catalyst, there being provided no temperature regulator or temperature regulation in the proper sense for this target component.

In an especially preferred embodiment of the method it is proposed that in addition to the temperature of the component being heated (associated with the temperature regulation) and the temperature of the target component, also the temperature of a further component in the exhaust system, especially an upstream component, preferably the closest component to the engine, is observed and also factored into the pulse control. In particular, the demand for the heating operation mode can be ended or paused (heating pause) when a given temperature threshold is reached for the temperature in this component not being heated in the traditional sense. In this way, the reaching of critical temperature regions in this component can be avoided. The reaching of the temperature threshold in this component, for which no temperature regulation is provided in the traditional sense, can be monitored in particular with the aid of a temperature gradient. By observing the temperature gradient, a prediction as to the further expected temperature rise can be done in especially expedient manner. If after a heating pause the temperature in the exhaust system and especially in this component closest to the engine for example has dropped once again, the demand for the heating operation mode can be started once again or the next heating pulse can be called off. This sequence of heating pulses and heating pauses can be continued until such time as the target temperature is reached in the target component, e.g., in the SCR catalyst.

After this, the pulse control can also be used to maintain a target temperature in the target component, e.g., in the SCR catalyst. As compared to a traditional, onetime demand for the heating operation mode, the described method has the especially advantageous effect that a smoother temperature variation is achieved without too much overshooting and undershooting, as well as a more precise maintaining of the target temperature.

In especially preferred manner, the threshold value for the temperature gradient which is preferably monitored in this sense is made dependent on the absolute value of the exhaust gas temperature. For example, a high gradient may be advantageous for a low exhaust gas temperature, in order to achieve the fastest possible heating. On the other hand, the gradient should advantageously be relatively small for high exhaust gas temperature, in order to avoid temperature overshoots.

In especially preferred manner, the attaining of a critical temperature for at least one of the components in the exhaust system can thus be avoided by the pulse control. Furthermore, it may be provided advantageously that the pulse control is used to maintain a target temperature in the target component, e.g., in the SCR catalyst, for which no temperature regulator properly speaking is provided.

For the heating of the exhaust system or for the traditional heating operation modes, it is generally required to operate the combustion engine at an operating point with lower efficiency and/or to introduce additional fuel into the exhaust system. In both cases, the fuel consumption generally rises, the additional fuel consumption resulting for example from the difference between the post-injection during the heating operation minus the post-injection that would have been demanded at the present engine operating point without additional heating operation. In order to optimize the fuel demand, in an especially advantageous embodiment of the method, the additional fuel demand needed for the heating operation mode is factored into the pulse control. For this, the additional fuel demand needed for the heating operation mode can be used to define a maximum length of a heating pulse. From this maximum length of the heating pulse, a threshold value can be derived, so that the demand for the heating operation mode is dependent on this threshold value. Thus, the additional fuel consumption may be used alternatively or additionally to the conditions based on the temperature or the temperature gradient in order to define or limit the length of a heating pulse. In this way, the method for the heating of the exhaust system can also be optimized in regard to the fuel demand required for this. The threshold value for limiting the length of a heating pulse can be made dependent on the absolute value of the exhaust gas temperature.

In analogous manner, a minimum duration can be set for the definition of a heating pause, which is chosen in dependence on the time and/or a physical quantity. For example, a certain minimum duration can be set as a supplemental condition for the heating pause or, for example, a physical quantity such as the exhaust gas mass flow can be factored in as a supplemental condition for the minimum duration of the heating pause. The threshold value for the minimum duration of the heating pause may also be made dependent on the absolute value of the exhaust gas temperature.

In a further advantageous embodiment of the described method, a prediction of the temperature variation in the exhaust system (during a normal operation without heating measures) may also be factored into the pulse control. This prediction of the temperature variation is based in particular on higher-level information, such as short range data of a navigation system. For example, the pulse control of the heating operation may factor in information as to whether the vehicle speed will presumably change in the near future or remain the same, in order to appropriately shorten or length the heating pulses and/or heating pauses so as to manage in the most optimal manner possible the additional fuel consumption required for the heating operation. For example, if the motor vehicle will presumably increase its speed in the near future, for example due to the drive shifting from the inner city to the countryside, the current heating pulse or a current heating pause can be lengthened, since the exhaust system will be heated simply by the increase in the speed. Conversely, the opposite will apply when the driving conditions are reversed. The same principle may be used, e.g., with the aid of data about the further variation in the terrain (slopes/gradients).

The invention furthermore relates to a computer program which is set up to carry out the steps of the described method. Moreover, the invention relates to a machine-readable storage medium on which such a computer program is stored, as well as an electronic controller which is designed to carry out the steps of the method. The implementation of the method as a computer program has the special advantage that this method can be used in existing motor vehicles with little application expense, so that the method can be used for example as a simple expansion solution for existing controller functions.

BRIEF DESCRIPTION OF THE DRAWINGS

Further features and advantages of the invention will emerge from the following description of exemplary embodiments in conjunction with the figures. The individual features each time may be realized in themselves or in combination with each other.

The figures show.

DETAILED DESCRIPTION

Figure 1:
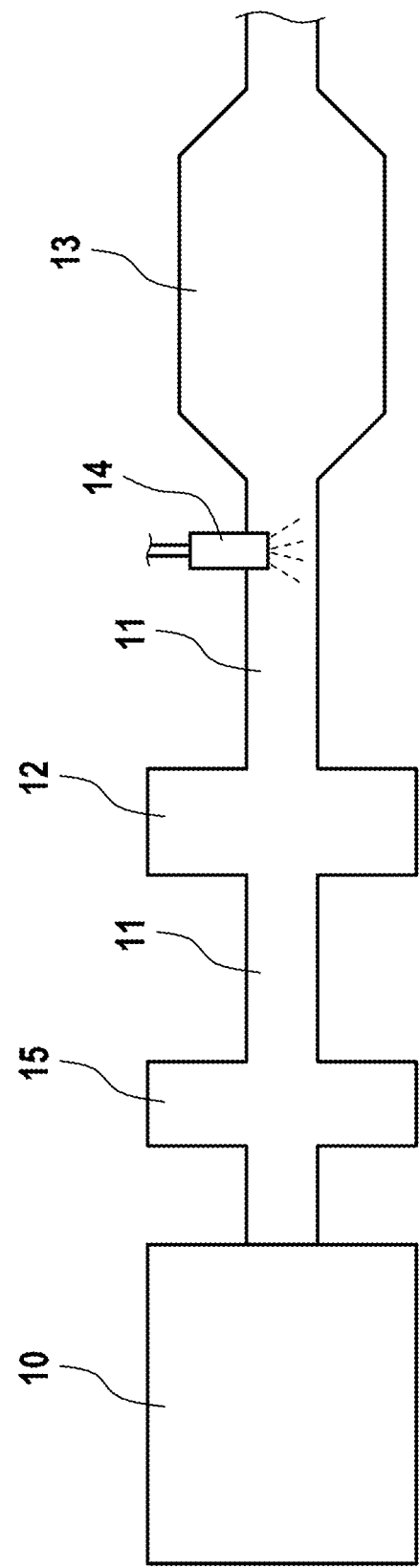
FIG. 1, a schematic representation of a portion of the exhaust system of a combustion engine of a motor vehicle.

FIG. 1 shows a portion of a traditional, exemplary exhaust system (exhaust gas line) 11 of a combustion engine 10 for which the method according to the invention can be used. In this example of an exhaust system 11, a diesel particle filter (DPF) 12 and a downstream SCR catalyst (SCR) 13 are provided, being situated at a distance from the engine. A dispensing module 14 upstream from the SCR catalyst 13 ensures a timely dispensing of a reducing agent solution for the SCR catalyst 13. In the exhaust system 11, various temperature sensors and nitrogen oxide sensors are provided (not otherwise shown here), whose metered data is relayed to an electronic controller and is utilized for a managing of the processes. For a regeneration of the diesel particle filter 12, during which a burning of the built-up particles is done, a certain high temperature is required. Usually in today's diesel-operated vehicles, a temperature regulation is provided for the heating of the diesel particle filter 12, in order to make possible a particle filter regeneration. One or more different heating operation modes may be used in known manner for the heating of the diesel particle filter 12, in order to raise the temperature in the exhaust system so that the diesel particle filter 12 can reach the required temperature. Upstream from the diesel particle filter 12 there is arranged a NOx storage catalyst (NSC) 15, which is situated close to the engine.

Figure 2:
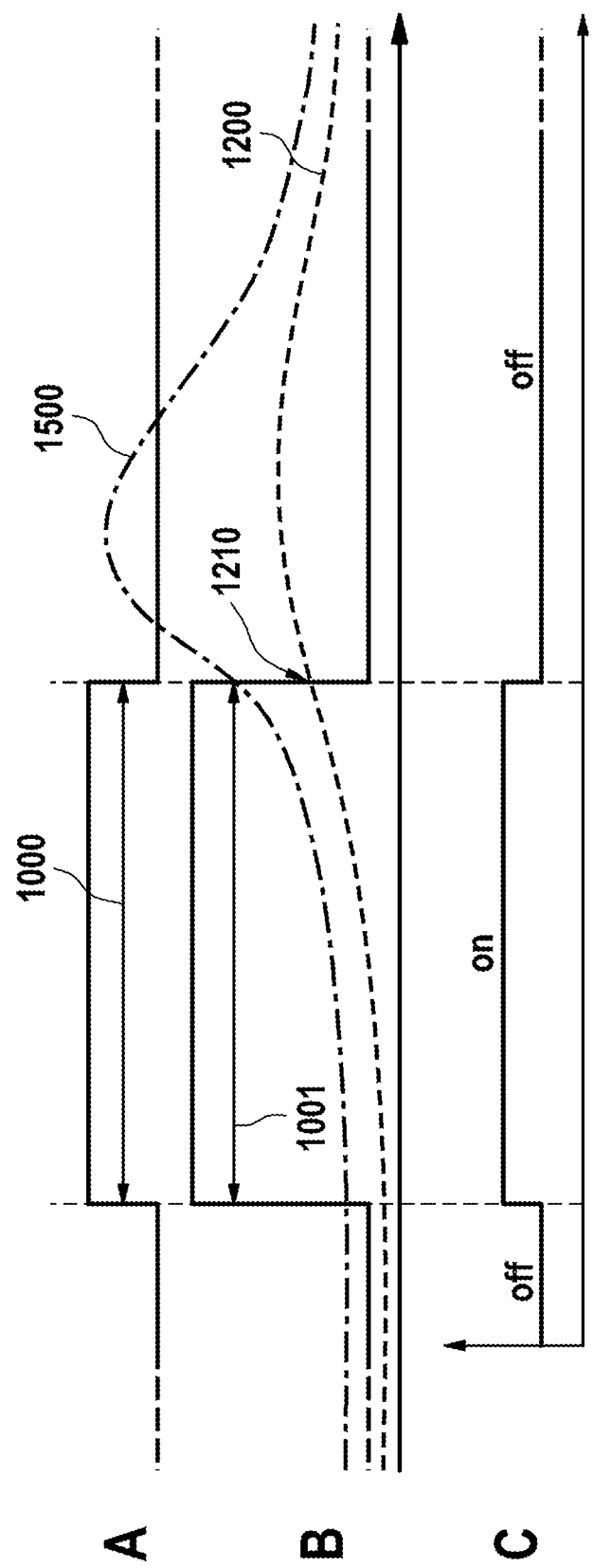
FIG. 2, the time variation of the temperature in individual components of an exhaust system during a traditional heating process in the exhaust system, and FIG. 3, the time variation of the temperature in individual components of an exhaust system during a heating of the exhaust system according to the method of the invention.

FIG. 2 illustrates a traditional method for heating the exhaust system, by which for example a particular temperature for the regeneration of the diesel particle filter 12 should be reached. In the upper part A of the figure, the beginning and the end of the traditional heating mode 1000 are shown, by which the exhaust system is supposed to be heated. In the lower part C of the figure, the demand for the heating operation mode as provided in this traditional method is represented, the heating operation mode being demanded once and being continued until the desired temperature is reached in the component (e.g., the diesel particle filter) associated with the temperature regulation. The middle part B of the figure shows the heating operation mode which is carried out. The resulting temperature variation in the target component of the present proposed method, especially in the SCR catalyst 13, is denoted as 1200. At time 1210, the heating mode 1000 based on the temperature regulation for the diesel particle filter is ended. As a further temperature curve in this representation, the temperature variation 1500 of a further component of the exhaust system, such as the NOx storage catalyst 15 near the engine, is shown. The temperature in this component near the engine rises with the heating operation 1000 and also continues to rise in problematical manner after the ending of the heating mode up to a very high range, which may result in a damaging of the component and/or unwanted influences on the nitrogen oxide emissions.

Figure 3:
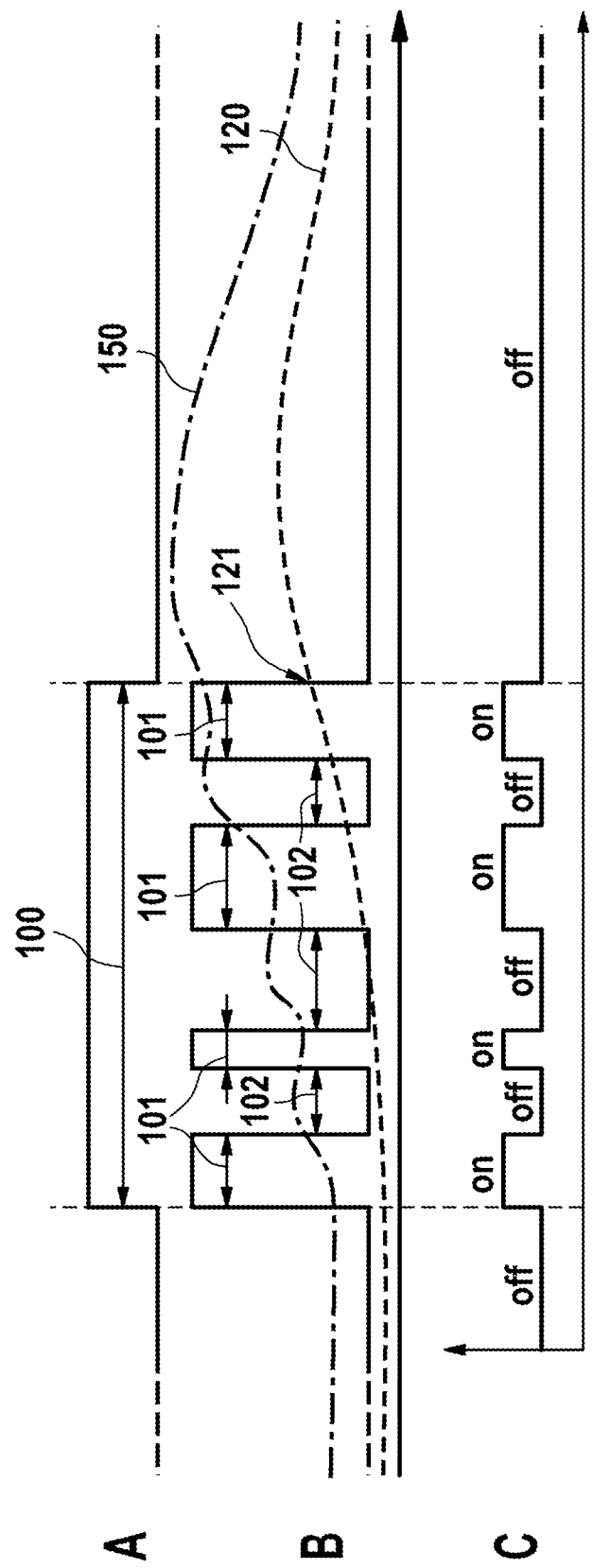

FIG. 3 shows in a comparable representation the method according to the invention for the heating of the exhaust system, wherein a pulse control with heating pulses 101 and heating pauses 102 is carried out. As in FIG. 2, the temperature regulation refers, as an example, to the diesel particle filter 12. The heating pulses 101 and the heating pauses 102 are demanded during the heating mode 100 for the diesel particle filter 12, the switching between the heating pulses 101 and the heating pauses 102 being made dependent on reaching particular threshold values of the temperature variation in an upstream component. In this example, the temperature variation 150 in the component near the engine (e.g., the NOx storage catalyst 15), is used for this. In particular, when a particular threshold value is exceeded for a temperature gradient in the temperature variation 150 of the component near the engine, there is a switch from a heating pulse 101 to a heating pause 102. This avoids the reaching of a critical temperature in the upstream component 15 near the engine. Furthermore, a smoother temperature variation is achieved without too much overshooting and undershooting in the component 15 near the engine. Upon reaching the target temperature in the target component, i.e., the SCR catalyst 13, the heating mode 100 is ended at time 121. Thanks to this pulse control per the method according to the invention, a subsequent uncontrolled rise in temperature in the component 15 near the engine is avoided, so that no critical temperature regions are reached. At the same time, this method also achieves a desired heating of other components in the exhaust system, especially in the SCR catalyst 13, which may be required for example for its optimal function and/or for diagnostic purposes. With this heating mode 100, the required operating temperature for the SCR catalyst 13 can be achieved for example in especially advantageous manner, wherein the temperature regulation for another component in the exhaust system, in this example a temperature regulation for the diesel particle filter 12, is utilized and at the same time the pulse control avoids any detrimental effects of the heating of the exhaust system 11, such as critical temperature ranges for a component near the engine, like the NOx storage catalyst 15.

The layout of the exhaust system shown here with NSC 15, DPF 12 and SCR 13 is to be taken only as an example. Basically, the described method can be used for all exhaust gas components and is not limited to the examples explained here.

In general, the basic functionality of the method according to the invention can be summarized as follows in exemplary manner: the heating operation 100 starts with a heating pulse 101. The heating pulse 101 and thus the demand for the heating operation mode are maintained until such time as a critical temperature gradient is exceeded in an upstream component, i.e., one near the engine, not associated with the actual temperature regulation. Alternatively or additionally, the heating pulse 101 may be ended when the additional fuel consumption for a heating pulse required for the heating operation mode has reached a given upper limit. After this, there is a switch to a heating pause 102 without demand for the heating operation mode. The heating pause 102 is maintained until such time as the temperature gradient in the upstream component has dropped below a critical threshold and optionally a minimum pause duration has reached a selectable upper limit. After reaching the target temperature 121 in the actual target component 12, the heating operation 100 is ended or possibly maintained further in order to maintain the temperature in the target component 12, until an external demand issues the command for turning off the heating operation 100.

The invention claimed is:

1. A method for heating an exhaust system of a combustion engine (10) of a motor vehicle, wherein the exhaust system comprises at least two components (12, 13, 15) for exhaust gas cleaning and wherein for a first component (12) of the at least two components (12, 13, 15), a temperature regulation is provided for heating the first component (12) while in a heating operation mode, wherein, in the heating operation mode, a heating operation is used for additionally heating a second component (13) of the at least two components (13, 15), for which no temperature regulation is provided, via a pulse control including heating pulses (101) and heating pauses (102), and
wherein the method further comprises switching between the heating operation mode and a normal operation that does not include heating measures and wherein the heating operation mode includes affecting an injection timing of the combustion engine (10).

2. The method according to claim 1, wherein a demand for the heating operation mode is made based on attaining a temperature threshold for a temperature in the second component of the at least two components in the exhaust system for which no temperature regulation is provided.

3. The method according to claim 2, wherein the attaining of the temperature threshold is monitored via a temperature gradient.

4. The method according to claim 3, wherein a threshold value for the temperature gradient is dependent on an absolute value of an exhaust gas temperature.

5. The method according to claim 1, wherein attaining of a critical temperature for at least one of the at least two components in the exhaust system is avoided by the pulse control.

6. The method according to claim 1, wherein the pulse control is used to maintain a target temperature in the second component (13) of the exhaust system for which no temperature regulation is provided.

7. The method according to claim 1, wherein an additional fuel demand needed for the heating operation mode is used to define a maximum length of a heating pulse of the heating pulses (101) of the pulse control and a demand of the heating operation mode occurs based on a derived heating pulse length threshold value.

8. The method according to claim 7, wherein in the heating pulse length threshold value is based on an absolute value of an exhaust gas temperature used.

9. The method according to claim 1 further comprising setting a minimum duration for defining a heating pause of the heating pauses (102) of the pulse control based on a physical quantity.

10. The method according to claim 9 further comprising setting a heating pause length threshold value for the minimum duration of the heating pause (102) based on an absolute value of an exhaust gas temperature.

11. The method according to claim 1, wherein the pulse control is based on a prediction of a temperature variation in the exhaust system during the normal operation without heating measures.

12. An electronic controller which is designed to carry out the steps of the method according to claim 1.

13. The method according to claim 1, wherein the second component (13) is located upstream of the first component (12).

14. A method for heating an exhaust system of a combustion engine (10) of a motor vehicle, wherein the exhaust system comprises at least three components (12, 13, 15) for exhaust gas cleaning and wherein for a first component (12) of the at least three components (12, 13, 15), a temperature regulation is provided for heating the first component (12) while in a heating operation mode, wherein, in the heating operation mode, a heating operation is used for additionally heating a second component (13) and a third component (15)

of the at least three components (13, 15), for which no temperature regulation is provided, via a pulse control including heating pulses (101) and heating pauses (102), and wherein the method further comprises switching between the heating operation mode and a normal operation that does not include heating measures.

* * * * *